US012596884B2

(12) United States Patent
Hirshberg et al.

(10) Patent No.: US 12,596,884 B2
(45) Date of Patent: Apr. 7, 2026

(54) NATURAL LANGUAGE PROCESSING BASED DOMINANT ITEM DETECTION IN VIDEOS

(71) Applicant: MICROSOFT TECHNOLOGY LICENSING, LLC, Redmond, WA (US)

(72) Inventors: Tom Hirshberg, Haifa (IL); Yonit Hoffman, Herzeliva (IL); Zvi Figov, Modiin (IL); Maayan Yedidia, Ramat Gan (IL)

(73) Assignee: Microsift Technology Licensing, LLC, Redmond, WA (US)

( * ) Notice: Subject to any disclaimer, the term of this patent is extended or adjusted under 35 U.S.C. 154(b) by 272 days.

(21) Appl. No.: 18/319,214

(22) Filed: May 17, 2023

(65) Prior Publication Data

US 2024/0303442 A1     Sep. 12, 2024

Related U.S. Application Data

(60) Provisional application No. 63/451,367, filed on Mar. 10, 2023.

(51) Int. Cl.
*G06F 40/40*        (2020.01)
*G06V 10/764*       (2022.01)
            (Continued)

(52) U.S. Cl.
CPC ............ *G06F 40/40* (2020.01); *G06V 10/764* (2022.01); *G06V 20/63* (2022.01); *G06V 30/10* (2022.01);
            (Continued)

(58) Field of Classification Search
CPC ........ G06F 40/40; G06V 30/10; G06V 20/63; G06V 10/764; G06V 2201/07; G06V 2201/09
See application file for complete search history.

(56) References Cited

U.S. PATENT DOCUMENTS 7,512,900 B2 * 3/2009 Lynch ................. G06F 16/3334
                                                            715/708
2007/0292106 A1 * 12/2007 Finkelstein .............. H04N 5/91
                                                            386/E5.003

(Continued)

FOREIGN PATENT DOCUMENTS

EP            4336379 A1      3/2024

OTHER PUBLICATIONS

International Search Report and Written Opinion received for PCT Application No. PCT/US2024/018576, Jun. 18, 2024, 18 pages.
(Continued)

*Primary Examiner* — David F Dunphy
(74) *Attorney, Agent, or Firm* — Workman Nydegger

(57)        ABSTRACT
Systems and method are provided for extracting and processing terms referenced in multimedia content with the use of different term extraction models to determine the relevance of categories to the referenced terms and to rank the categories by relative dominance for the multimedia content. The most dominant category for the multimedia content and/or particular segment(s) of the multimedia content can then be identified and used to link to supplemental content and/or to identify multimedia content related to topics of interest.

20 Claims, 12 Drawing Sheets

700

```
                                                    ┌─ 710
┌──────────────────────────────────────────────────────────┐
│ Accessing A First Image Captured By A First Image Sensor   │
│ And A Second Image Captured By A Second Image Sensor       │
└──────────────────────────────────────────────────────────┘
                           │          ┌─ 720
                           ▼
┌──────────────────────────────────────────────────────────┐
│         Identify Segments Of The Multimedia Content        │
└──────────────────────────────────────────────────────────┘
                           │          ┌─ 730
                           ▼
┌──────────────────────────────────────────────────────────┐
│ Identify Terms Represented Within Each Of The Segments By   │
│ Applying Term Extraction Models To Each Segment             │
└──────────────────────────────────────────────────────────┘
                           │          ┌─ 740
                           ▼
┌──────────────────────────────────────────────────────────┐
│  Apply Embeddings To The Identified Terms From Each Segment │
└──────────────────────────────────────────────────────────┘
                           │          ┌─ 750
                           ▼
┌──────────────────────────────────────────────────────────┐
│ Categorize Each Term To A Relevant Category Based On The    │
│ Embeddings And A Comparison Of The Relative Similarity Of   │
│ Each Term                                                   │
└──────────────────────────────────────────────────────────┘
                           │          ┌─ 760
                           ▼
┌──────────────────────────────────────────────────────────┐
│ Identify A Dominant Category For Each Segment Of The        │
│ Multimedia Content Based On A Ranking Of The Plurality Of   │
│ Categories And By Calculating A Dominance Feature Relevance  │
│ Of The Different Terms Within Each Category                 │
└──────────────────────────────────────────────────────────┘
                           │          ┌─ 770
                           ▼
┌──────────────────────────────────────────────────────────┐
│ Index Data That References Or Links Categorization Data     │
│ With Different Multimedia Content                           │
└──────────────────────────────────────────────────────────┘
```

(51) Int. Cl.
   *G06V 20/62*          (2022.01)
   *G06V 30/10*          (2022.01)
(52) U.S. Cl.
   CPC ...... *G06V 2201/07* (2022.01); *G06V 2201/09*
                                                  (2022.01)

(56)                    References Cited

U.S. PATENT DOCUMENTS

| | | | |
|---|---|---|---|
| 2019/0294668 A1* | 9/2019 | Goel | .................. H04N 21/4788 |
| 2020/0105274 A1 | 4/2020 | Joller et al. | |
| 2020/0372066 A1 | 11/2020 | Saggi et al. | |
| 2020/0372073 A1* | 11/2020 | Dahl | ...................... G06V 10/82 |
| 2021/0374408 A1* | 12/2021 | Kim | ........................ G06F 16/51 |
| 2024/0086452 A1 | 3/2024 | Agley | |

OTHER PUBLICATIONS

U.S. Appl. No. 63/451,367, filed Mar. 10, 2023.
International Preliminary Report on Patentability (Chapter I) received
for PCT Application No. PCT/US2024/018576, mailed on Sep. 18,
2025, 12 pages.

* cited by examiner

⋮

| | |
|---|---|
| Segment 1 | |
| Segment 2 | |
| Segment 3 | |
| Segment 4 | |
| Segment 5 | |
| Segment 6 | |
| Segment 7 | |
| Segment 8 | |
| Segment 9 | |
| Segment 10 | |
| Segment 11 | |
| Segment 12 | |
| Segment 13 | |
| Segment 14 | |
| Segment 15 | |
| Segment 16 | |
| Segment 17 | |

Metadata 120

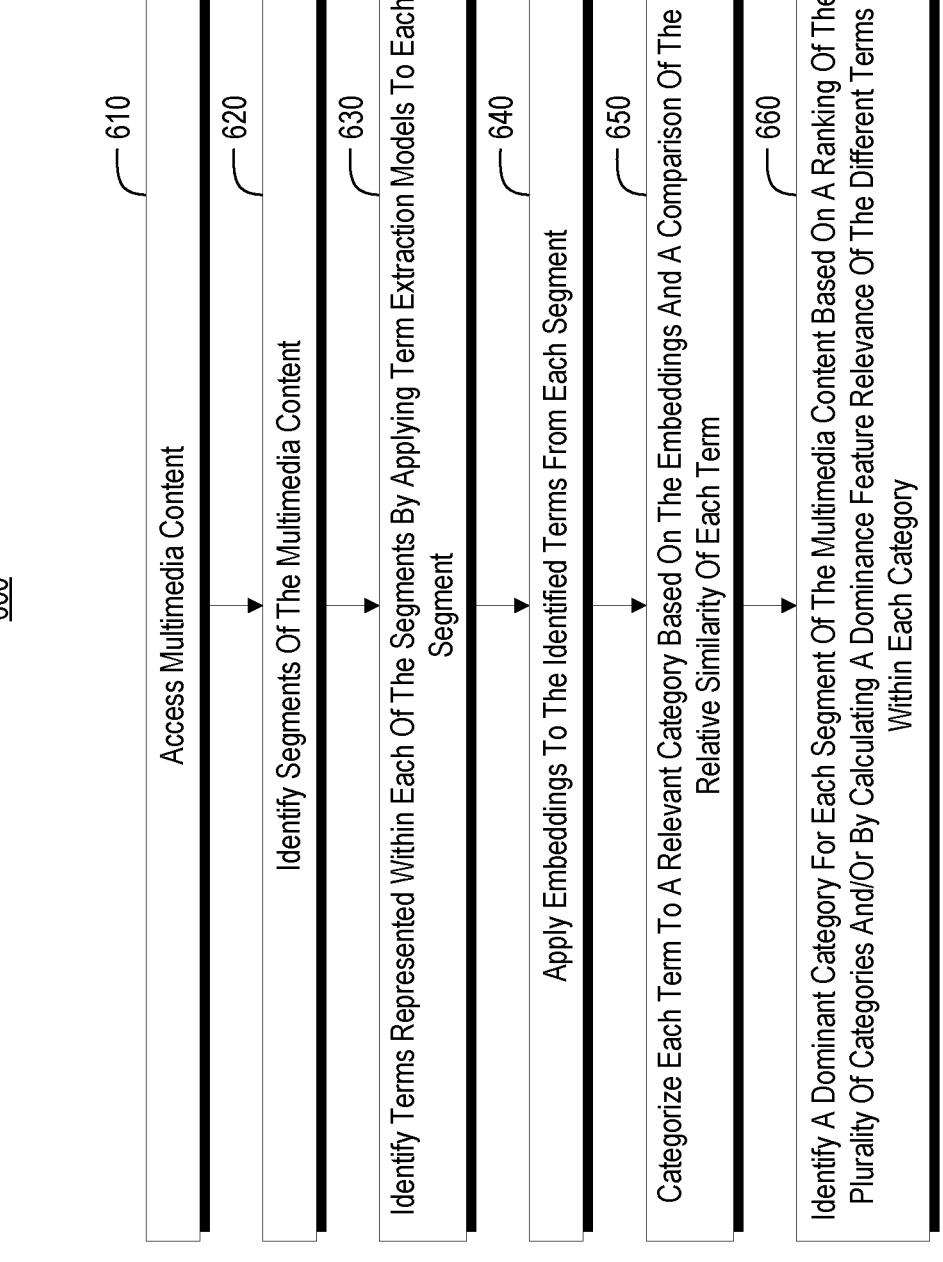

600

610 Access Multimedia Content

620 Identify Segments Of The Multimedia Content

630 Identify Terms Represented Within Each Of The Segments By Applying Term Extraction Models To Each Segment 640 Apply Embeddings To The Identified Terms From Each Segment 650 Categorize Each Term To A Relevant Category Based On The Embeddings And A Comparison Of The Relative Similarity Of Each Term 660 Identify A Dominant Category For Each Segment Of The Multimedia Content Based On A Ranking Of The Plurality Of Categories And/Or By Calculating A Dominance Feature Relevance Of The Different Terms Within Each Category

FIG. 6

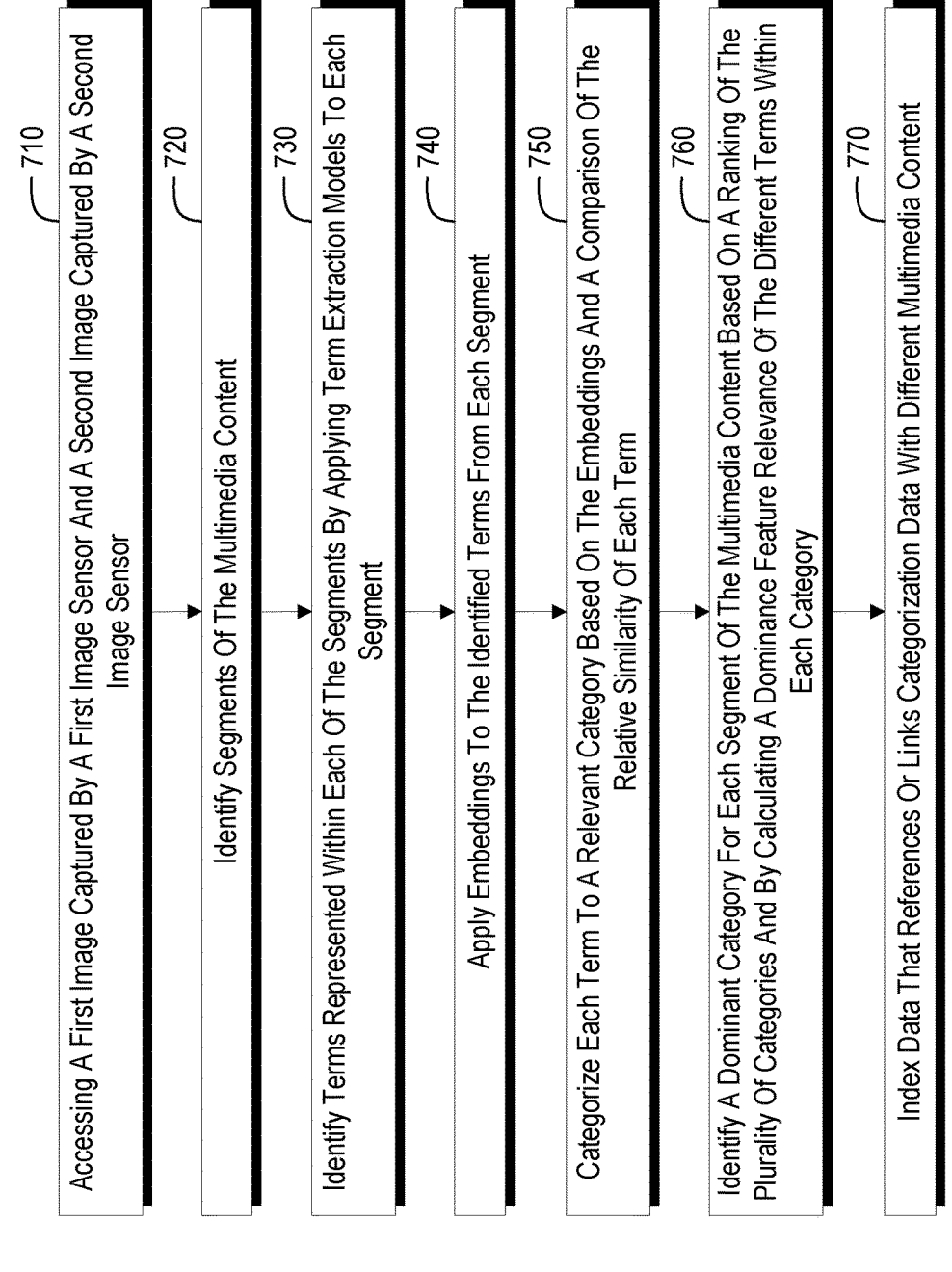

700

710 Accessing A First Image Captured By A First Image Sensor And A Second Image Captured By A Second Image Sensor 720 Identify Segments Of The Multimedia Content 730 Identify Terms Represented Within Each Of The Segments By Applying Term Extraction Models To Each Segment 740 Apply Embeddings To The Identified Terms From Each Segment 750 Categorize Each Term To A Relevant Category Based On The Embeddings And A Comparison Of The Relative Similarity Of Each Term 760 Identify A Dominant Category For Each Segment Of The Multimedia Content Based On A Ranking Of The Plurality Of Categories And By Calculating A Dominance Feature Relevance Of The Different Terms Within Each Category 770 Index Data That References Or Links Categorization Data With Different Multimedia Content

FIG. 7

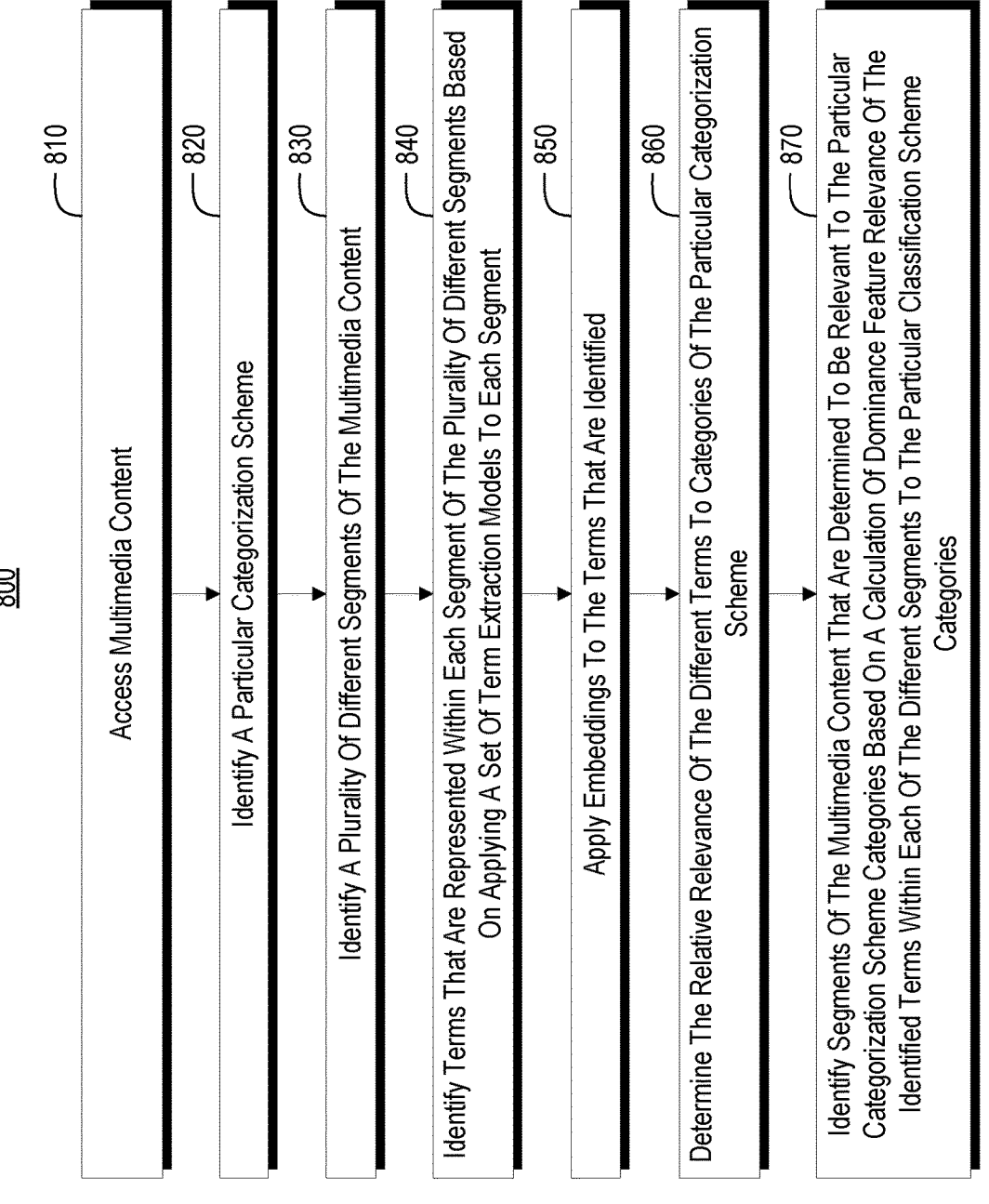

800

810 — Access Multimedia Content

820 — Identify A Particular Categorization Scheme

830 — Identify A Plurality Of Different Segments Of The Multimedia Content

840 — Identify Terms That Are Represented Within Each Segment Of The Plurality Of Different Segments Based On Applying A Set Of Term Extraction Models To Each Segment 850 — Apply Embeddings To The Terms That Are Identified 860 — Determine The Relative Relevance Of The Different Terms To Categories Of The Particular Categorization Scheme 870 — Identify Segments Of The Multimedia Content That Are Determined To Be Relevant To The Particular Categorization Scheme Categories Based On A Calculation Of Dominance Feature Relevance Of The Identified Terms Within Each Of The Different Segments To The Particular Classification Scheme Categories

*FIG. 8*

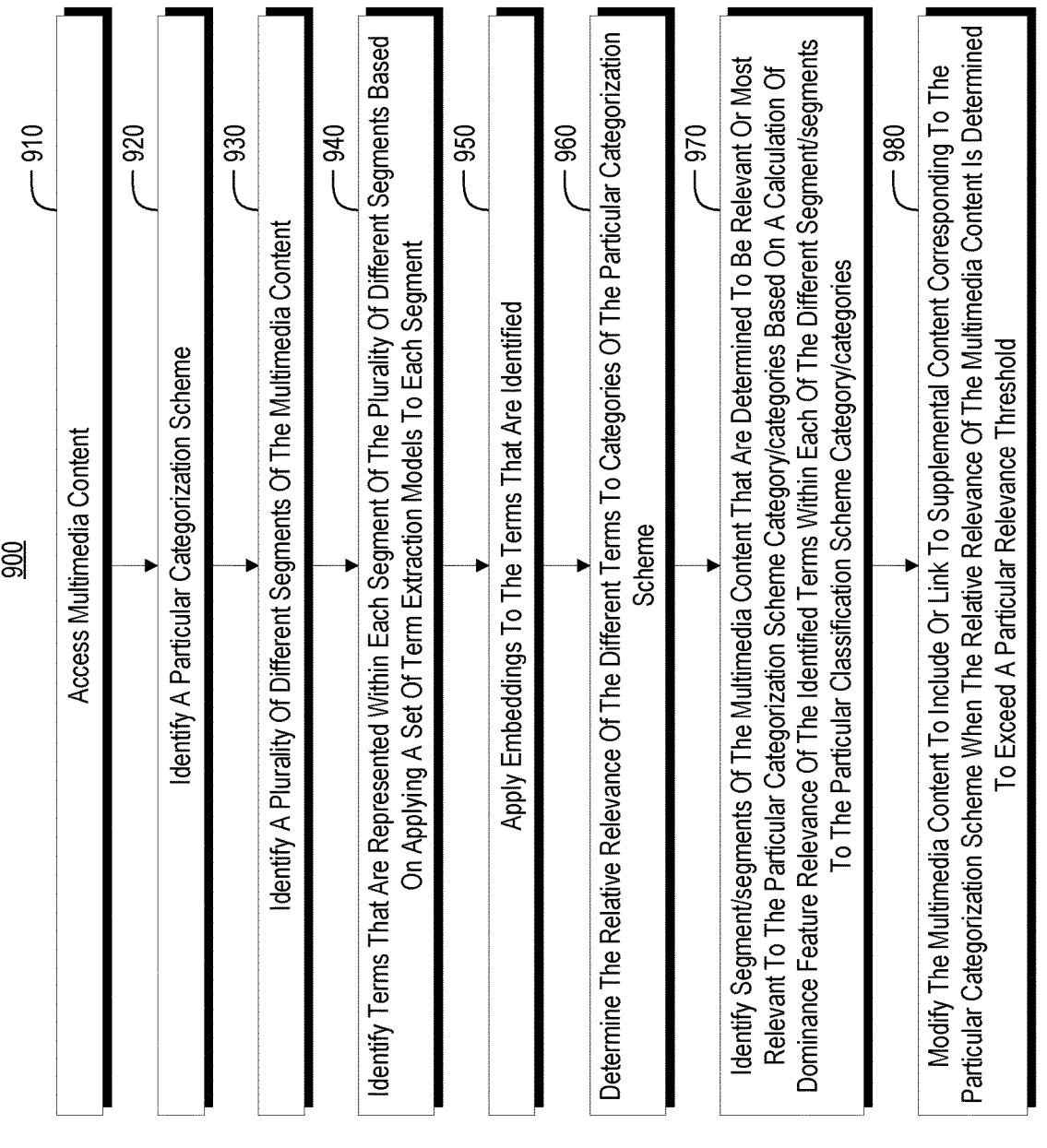

900

910 Access Multimedia Content

920 Identify A Particular Categorization Scheme

930 Identify A Plurality Of Different Segments Of The Multimedia Content

940 Identify Terms That Are Represented Within Each Segment Of The Plurality Of Different Segments Based On Applying A Set Of Term Extraction Models To Each Segment 950 Apply Embeddings To The Terms That Are Identified 960 Determine The Relative Relevance Of The Different Terms To Categories Of The Particular Categorization Scheme 970 Identify Segment/segments Of The Multimedia Content That Are Determined To Be Relevant Or Most Relevant To The Particular Categorization Scheme Category/categories Based On A Calculation Of Dominance Feature Relevance Of The Identified Terms Within Each Of The Different Segment/segments To The Particular Classification Scheme Category/categories 980 Modify The Multimedia Content To Include Or Link To Supplemental Content Corresponding To The Particular Categorization Scheme When The Relative Relevance Of The Multimedia Content Is Determined To Exceed A Particular Relevance Threshold

*FIG. 9*

NATURAL LANGUAGE PROCESSING BASED DOMINANT ITEM DETECTION IN VIDEOS

CROSS-REFERENCE TO RELATED APPLICATIONS

This application claims the benefit of and priority to U.S. Provisional Patent Application Ser. No. 63/451,367 filed on Mar. 10, 2023, and entitled "NATURAL LANGUAGE PROCESSING BASED DOMINANT ITEM DETECTION IN VIDEOS," and which application is expressly incorporated herein by reference in its entirety.

BACKGROUND

Multimedia content has been created to suit various interests and preferences. By way of example, there are numerous videos focused on content related to children's entertainment, academic endeavors, athletic events, nature and exploration, fashion, architecture, social and music events, medicine, technological developments, as well as many other topics. The content in any particular video may also correspond to numerous different topics.

In view of the quantity and diversity of videos that have been created, there is an ongoing need and desire to process and analyze the content of the videos to help viewers understand the general topics being discussed and the items of potential relevance within the stored videos and other forms of multimedia content (e.g., streaming content). This can be helpful, for example, to identify and route the media content to interested parties. Sometimes, advertisers also want to pair their advertisements with content that is relevant to the products they want to advertise and/or to direct advertisements to users viewing the multimedia content that contains references to the advertised items.

Unfortunately, because of the diverse manner in which multimedia content is created, as well as the various techniques that can be used to analyze the multimedia, it can sometimes be difficult to ascertain which items and topics from the multimedia should be indexed as relevant for the multimedia.

Conventional techniques for analyzing and indexing the topics and items that are referenced in multimedia content include the manual insertion of tags and other metadata identifiers that are embedded within the multimedia file by a human observer who independently determines which labels to use for annotating the multimedia content. For example, an editor might determine whether a particular celebrity is being shown within the video, whether a particular topic is being discussed, and/or whether other items of interest may be displayed. Then, the human editor may add metadata descriptors that index those items for the corresponding temporal locations where they exist within the file. Unfortunately, there is very little control over the consistency in which files are annotated and conventional systems are not configured to automatically determine which features or elements of a media file are most dominant within a media file that has not already been annotated. This is particularly true for streaming media content.

Some conventional systems are configured to generate transcripts for the audio portions of a video, as well as other forms of multimedia content like streaming content. However, when a transcript is created, the transcript does not reflect any relative relevance of the various items mentioned in the transcript. The transcript also fails to capture the essence of items that are visualized (e.g., banners and labels that are displayed but not spoken).

It may be possible for a user to perform a keyword look-up for a term that may appear in a transcript, such as in an attempt to find content related to the keyword of interest. However, such systems are not very practical and it is not easy for consumers to access the transcripts to perform such keyword searching. Conventional transcripts are also not indexed according to topical relevance, such that users are not able to easily search for videos containing topics or items of interest based on a simple search. This also makes it difficult to pair supplemental content like advertisements with multimedia content containing references to the relevant items associated with the supplemental content.

The subject matter claimed herein is not limited to embodiments that solve any disadvantages or that operate only in environments such as those described above. Rather, this background is only provided to illustrate one example technology area where some embodiments described herein may be practiced.

BRIEF SUMMARY

Disclosed embodiments are directed to systems and methods for identifying terms referenced in multimedia content and for identifying categories associated with the referenced terms and ranking the categories based on relevance or dominance within the multimedia content and/or any designated segment(s) of the multimedia content. In some instances, the dominance of a term reflects how prominent the term is relative to other detected terms and/or how similar a term is to a predetermined set of terms and categories relative to other detected terms.

The disclosed embodiments include systems and methods for performing natural language processing of spoken utterances detected within the multimedia content, as well as for identifying terms associated with other sounds that are not spoken utterances, as well as for identifying terms associated with visual content displayed in the multimedia content. Terms that are identified from or referenced by the audio and images of the multimedia content are used for ranking categories associated with those terms. The ranked categories can then be used to determine which categories are most dominant within the multimedia content and/or any designated segment(s) of the multimedia content.

The disclosed embodiments may include or be practiced on computing systems configured with machine learning models for performing natural language processing and other audio processing of the audio in the multimedia content, as well as machine learning modules for performing image processing of the images contained in the multimedia content. The computing systems also include machine learning modules for identifying and ranking categories that are associated with the referenced terms, as well as for implementing the other functions referenced herein.

In some instances, the disclosed methods include acts for accessing multimedia content, identifying different segments of the multimedia content, identifying different terms represented within the different media segments, applying embeddings to the different terms that are identified based on features of the terms, categorizing the terms based on the embeddings, and identifying the most relevant or dominant categories associated with each of the different segments of the multimedia content or for the multimedia content as a whole.

Some of the disclosed methods also include receiving an initial set of categories to use when analyzing the multimedia content and ranking the relevance of those categories to the multimedia content. Embodiments also include identifying the segments of the multimedia content that are most relevant to the predefined categories.

The natural language term(s) identified and analyzed by the disclosed systems and models may include any term(s) spoken/uttered in the audio of the multimedia content, as well as any term(s) that are contained in a transcript derived from the audio of the multimedia content. The uttered terms may be identified from an audio analysis of the multimedia content by machine learning models configured to perform natural language processing. Other terms identified from the multimedia content can also include terms identified from image processors and classifiers that detect objects that are visually presented in the multimedia content, and/or other machine learning model(s) configured to identify terms that are associated with unspoken sounds and images within the multimedia content.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosed systems and methods may be realized and obtained using the instruments and combinations particularly pointed out in the appended claims. Features of the present disclosed systems and methods will become more fully apparent from the following description and appended claims or may be learned by the practice of the disclosed systems and methods as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 1 illustrates an example of multimedia content comprising a multimedia file that includes a plurality of discrete segments.

FIG. 6 illustrates a flow diagram of example acts associated with methods for identifying and processing terms from multimedia content and for identifying and ranking categories associated with those terms.

FIG. 7 illustrates a flow diagram of example acts associated with methods for identifying and processing terms from multimedia content and for identifying and ranking categories associated with those terms, as well as for modifying the multimedia content and/or for creating index data to reflect relevant categories.

FIG. 8 illustrates a flow diagram of example acts associated with methods for identifying segments of multimedia content that are most relevant to predetermined categories.

FIG. 9 illustrates a flow diagram of example acts associated with methods for identifying segments of multimedia content that are most relevant to predetermined categories and modifying the multimedia content and creating index data to reflect relevant categories.

DETAILED DESCRIPTION

Figure 2A:
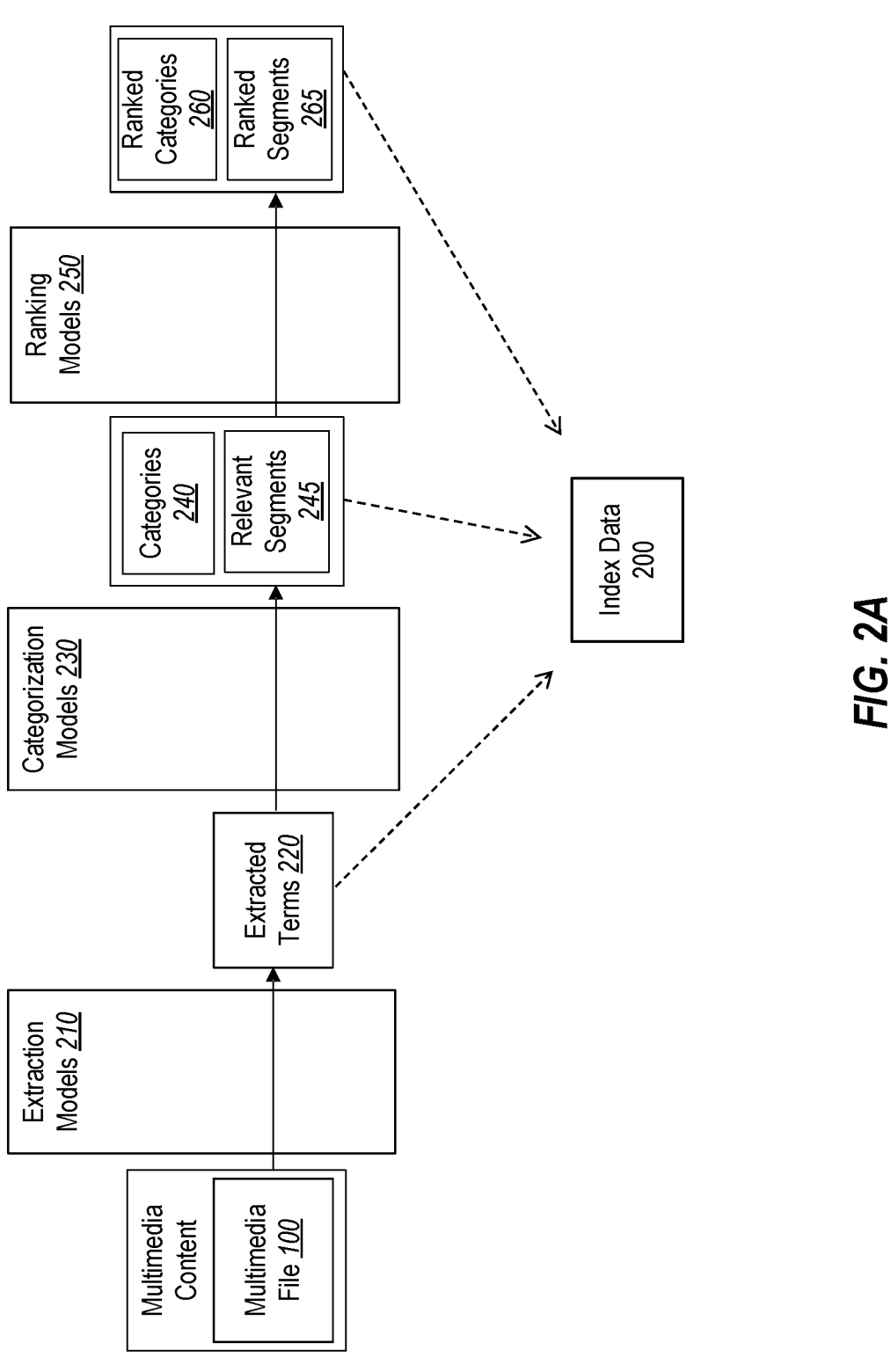
FIG. 2A illustrates an example flowchart for processing multimedia content to identify and index dominant categories based on natural language processing and image processing of the multimedia content.

Disclosed embodiments include systems and methods for natural language processing (NLP) of multimedia content to identify terms referenced in the multimedia content to identify the relative relevance of categories that are associated with the referenced terms.

Some of the disclosed embodiments are specifically directed to systems and methods for categorizing terms from the multimedia content (e.g., terms that are spoken, terms that are associated with unspoken sounds, and/or terms that are associated with images in the multimedia content), and ranking categories associated with the terms. The terms are identified and analyzed by different machine learning modules configured to perform audio processing and image processing on multimedia content, as will be described in more detail below.

In the following disclosure, the term multimedia content can include any type of media content containing any combination of audio, image, and/or text data. In some instances, the multimedia content is contained in a stored multimedia file, such as a video including audio and image data. However, while the referenced disclosure is particularly beneficial for video files, it will be appreciated that the disclosed embodiments can also be applied to other types of multimedia content, such as media files containing mere audio, or mere image data (e.g., silent film). The multimedia content can be configured as a stored file in non-volatile memory. In some instances, the multimedia content can also be processed and analyzed while it is in a streaming format, merely contained in a volatile cache or another type of transitory medium, before it is saved to a persistent memory format.

As described herein, the categorization processes and ranking of categories related to terms referenced in the multimedia content can be performed for the multimedia content (e.g., a video) as a whole, as well as for discrete segment(s) of the multimedia content (e.g., chapters, scenes, durations, or other segments of the multimedia content). The categorization processes and ranking of categories can also be performed for different media domains of the multimedia content (e.g., audio domain, visual domain).

In some instances, references are made to a set of terms or a set of categories. In this regard, it will be appreciated that the term "set" is a non-empty set, meaning that the set includes one or more of the recited items for the referenced set.

Attention will now be directed to FIG. 1, which illustrates multimedia content comprising a multimedia file 100 in the format of a video having audio and image data. The multimedia file 100 includes multiple segments 110. These segments 110 can be based on a temporal segmentation (e.g., timestamp or duration) or another segmentation schema (e.g., scene, chapter, act).

In some instances, a media source adds index data or tags that specify the start and end of different segments of the multimedia content that is generated and/or processed by the media source. This index data and/or tags can be used to identify the different multimedia content. In other instances, a machine learning model trained on training data that identifies different segments is used for detecting different segments of the multimedia content.

Metadata 120 specifies the segmentation features such as the timestamps and may also include references to elements contained within the different segments. Metadata 120 can be embedded within the media file and/or referenced in an appended index.

FIG. 2A illustrates a flowchart associated with processing that is applied to multimedia content (e.g., multimedia file 100) to identify terms referenced in the multimedia content and to identify and rank corresponding categories associated with the referenced terms. In this embodiment, the extraction models 210 are applied to audio and images in the multimedia content to identify terms referenced by the audio and images of the multimedia content. The extraction models 210 generate a set of extracted terms 220 that are referenced by the multimedia content.

Categorization models 230 are then applied to the extracted terms 220 to generate a set of categories 240 associated with the extracted terms 220. The categorization models 230 can also generate a set of relevant segments 245 from the multimedia file 100 that correspond to and that are determined by the categorization models 230 to be relevant to different predetermined categories, such as predetermined categories (e.g., key terms) that may be provided by a third-party provider. The third-party provider may be an advertiser, for example, which wants to correlate their advertisements with relevant multimedia content. The third-party provider may also be an end-user, in some instances, who wishes to identify portions of multimedia content that are relevant to keywords provided by the user.

As shown, the processing flow of FIG. 2A also includes the application of ranking models 250 to the set of categories 240 to generate a set of ranked categories 260 that rank the set of categories 240 by relative relevance to the multimedia content based on dominance features of the categories 240 and extracted terms 220. In some instances, the dominance features are attributes that relate to the terms associated with different categories 240, such as the duration and/or frequency in which terms corresponding to a category are detected within a particular segment of the multimedia content. The dominance features may also include the quantity of different terms and/or similarity and preponderance of detected terms that correspond to a particular category within particular multimedia segment(s).

The ranking of the categories may be based on the relative relevance of the categories to the multimedia content as a whole and/or for specific segments of the multimedia content.

The processing flow also includes generating or linking index data 200 associated with the multimedia content based on the extracted terms 220, categories 240, relevant segments 245, ranked categories 260, and/or ranked segments 265. Additional details regarding the foregoing will now be provided.

Figure 2B:
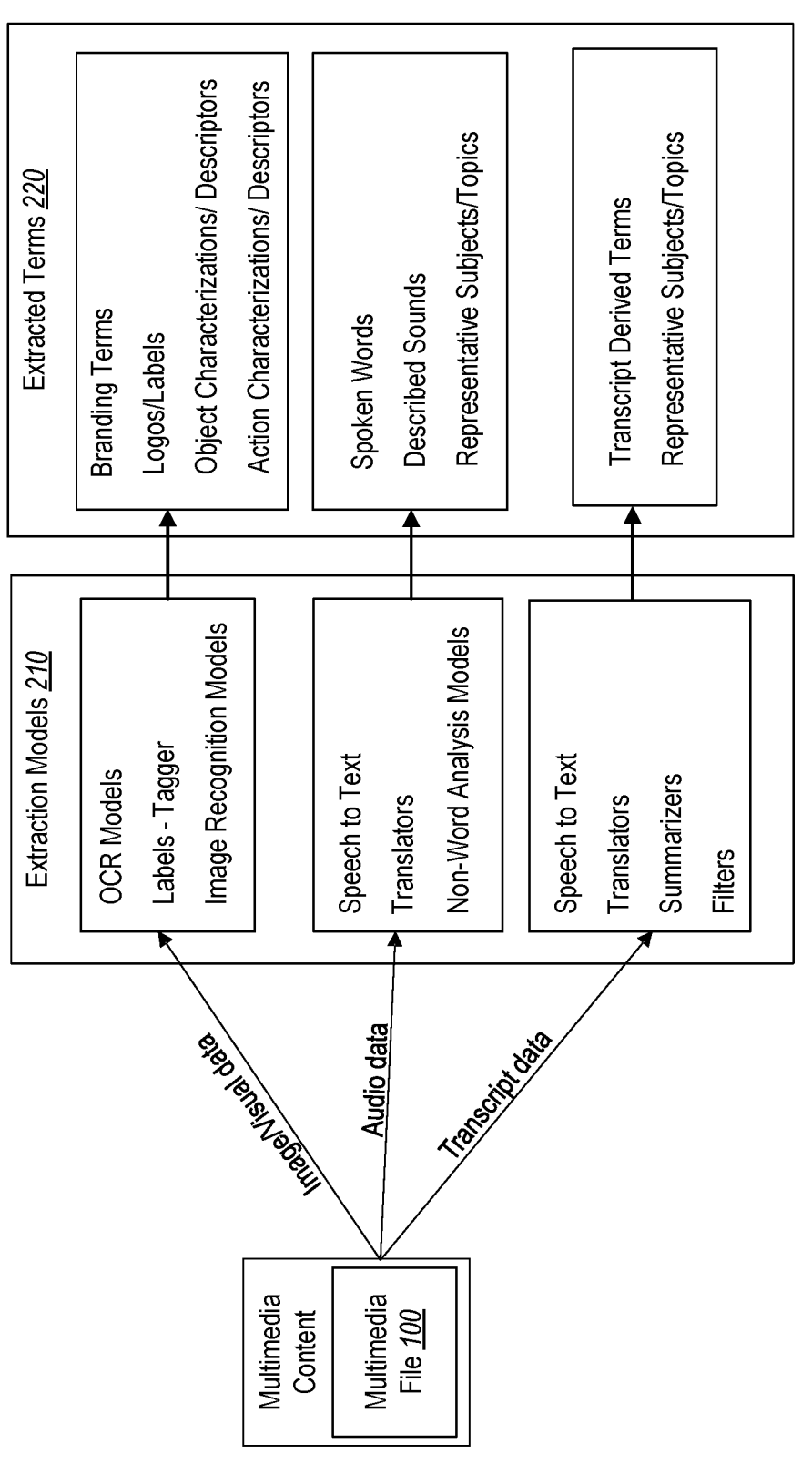
FIG. 2B illustrates another example flowchart for processing multimedia content which includes the use of extraction models to identify and extract terms from the multimedia content.

As shown in FIG. 2B, the multimedia content (e.g., a multimedia file or any segment(s) of the multimedia file) will undergo processing by one or more extraction models 210 that identify or otherwise extract terms from the multimedia content. More particularly, the extraction models 210 comprise machine learning algorithms that are trained to process audio and/or image content to identify and extract terms that are explicitly and/or inferentially presented in the audio or image content.

For items appearing in image/visual domains, the extraction models 210 process image content to identify objects or actions represented within the images. The terms that describe the objects or actions identified in the images are extracted as terms and assigned as labels for the objects or actions by the extraction models 210. In some instances, the terms may be explicitly presented (e.g., terms on a sign or billboard, labels on clothing or products). Terms referenced by the multimedia content can also be generated from image recognition models that are trained to identify objects and to label or classify the objects that are represented in the images, such as with optical character recognition (OCR) processing or other image identification processing. Emotions and/or actions that are evoked or presented within the image content can also be characterized with labels that comprise the terms extracted by the extraction models 210. The extraction models 210 can identify the characterization labels based on training undergone by the extraction models 210 on related training data.

Items appearing in audio domains can also be identified and labeled using audio analysis and natural language processing. In some instances, the labels or terms that are generated are textual representations of words that are spoken. This may include speech-to-text processing and/or translations of words that are spoken utterances in the audio of the multimedia content. In other instances, the terms are labels that correspond to analyzed non-word or non-spoken sounds detected in the audio (e.g., barking, engine running, horn honking). The extraction models 210 are trained to perform the audio processing and labeling based on training undergone by the extraction models 210 on related data.

Transcription data can be generated by and/or be processed by the extraction models 210 comprising translators, speech-to-text models for generating transcripts, as well as summarization models that have been trained on similar training data to summarize audio and/or textual data (e.g., transcripts). In this regard, in some embodiments, the transcription data can be viewed as a subset of the audio data and the disclosed systems can generate the transcript from the audio data.

In some alternative instances, the multimedia content may already have a preexisting transcript prepared by a third-party entity and/or that is stored with the media file. In these instances, the transcript is not considered a subset of the audio data processed by the current systems. Instead, it is a supplementary source of the multimedia content that is being processed to identify terms referenced in the multimedia content.

The recited text in the transcript can be summarized and/or filtered to extract representative topics or themes that are identified as terms or extracted from the transcript. The terms can also be generated by filtering and/or replacing an initial set of the terms (e.g., by changing a term from a less commonly used word to a more common synonym or representative word, by translating the term from one language to another language, and/or by changing a phrase into a more concise representative term for a topic associated with the phrase). The extraction models 210 can extract the terms from transcription data in the foregoing manner, by applying natural language processing on the text in the transcript, based on training applied to the extraction models 210 on similar data.

It will be noted that the resulting terms that are extracted (extracted terms 220) can be the actual labels generated by the extraction models 210 to characterize the identified images and audio. In some instances, the extracted terms comprise synonyms or descriptive terms related to the labels, rather than the actual labels themselves. In this regard, it will be appreciated that the extracted terms 220 can include, for example, labels, logos, object labels or descriptors, spoken words in the audio, words obtained from the transcripts, described sounds, representative subjects or topics, and/or any other terms or labels that can be generated from a machine learning model configured to analyze media content and to generate or identify specific terms contained in or related to the media content.

Once the various terms (e.g., extracted terms 220) that are referenced by the multimedia content are identified by the extraction models 210, the extraction models 210 and/or the categorization models 230 perform semantic analysis on the terms to generate or identify the set of categories that correspond to the extracted terms 220. This may include filtering out terms that are nonce words, words that are very common (e.g., certain parts of speech that are not a noun or verb, such as articles), and/or words that are not meaningful (e.g., 'umm'). Additional details regarding the categorization processes will now be provided with respect to the illustration shown in FIG. 2C.

Initially, it is noted, the extracted terms 220 may be processed at different granularities for the multimedia content (e.g., a whole media file and/or any one or more segment(s) of a media file), as described above.

The categorization models 230 are applied to the set of extracted terms 220 to generate or identify a set of categories 240 associated with the extracted terms 220 referenced in the multimedia content. In some instances, the set of categories 240 is generated or identified by the categorization models 230 generating embeddings 310 for the different extracted terms. These embeddings 310 comprise vectors or arrays of values that numerically represent the different terms and that can be used to determine a relative similarity of particular terms to one or more other terms.

The similarity between the terms can be determined, for example, by applying the vector embeddings to one or more similarity functions 330 that output values for quantifying proximity or distances in terms of similarity between the extracted terms and/or with other keywords 320 (e.g., predetermined categories or terms provided by third-party entities) and corresponding embeddings for those keywords 320. In some instances, a cosine-similarity function is used to quantify the similarities between the different terms.

Similarities of the terms can represent relative similarities to each of the other extracted terms, as well as to predetermined keywords or classes that are part of a predetermined classification schema.

In some instances, the categorization models 230 also determine a confidence score that is based on a computation of determined relevance or insight that the term provides for any particular segment.

A relevance score can also be computed to determine the relevance of the term to other terms that are being presented within a given time range within a segment or plurality of segments.

As described, the different relevance and confidence scores, and the determined relative similarities, are some of the dominance features 340 that can be used by the categorization models to identify categories that are determined to be relevant to the multimedia content. That said, these dominance features 340 can also be used by the ranking model (described below) to rank the categories 240 by relative relevance in a particular segment or temporal range of a media file based on the dominance feature value associated with each of the different category terms.

After or during the categorization of the multimedia content, the categorization models 230 can generate visualizations of the categories that are determined to be relevant to the multimedia content, as a whole and/or for discrete segments of the multimedia content, based on respective similarity scores and which can be used to illustrate clustering of the extracted terms to different categories based on their similarities to the category labels. Examples of category cluster visualizations, for example, are shown by the similarity graph 360 represented in FIGS. 3A and 3B.

Notably, each of the clusters 390 that are generated may already include a predetermined keyword or category label (e.g., shoes, car, hat, jewelry, watch, sunglasses, cosmetics from predetermined categories 370) and will include all terms that are determined to be within a predetermined proximity to that keyword or label. In some alternative embodiments, this also includes, generating a new category or class label that describes a clustering of terms for which a particular category or class label was not previously identified, but which are in a predefined proximity to other extracted terms in a particular clustering and/or that are a particular distance away from other extracted terms/term clusters.

The categorization models 230 may use any known techniques to determine the relevance of a term to a predetermined or known class, based on training undergone by the categorization models 230.

Figure 3A:
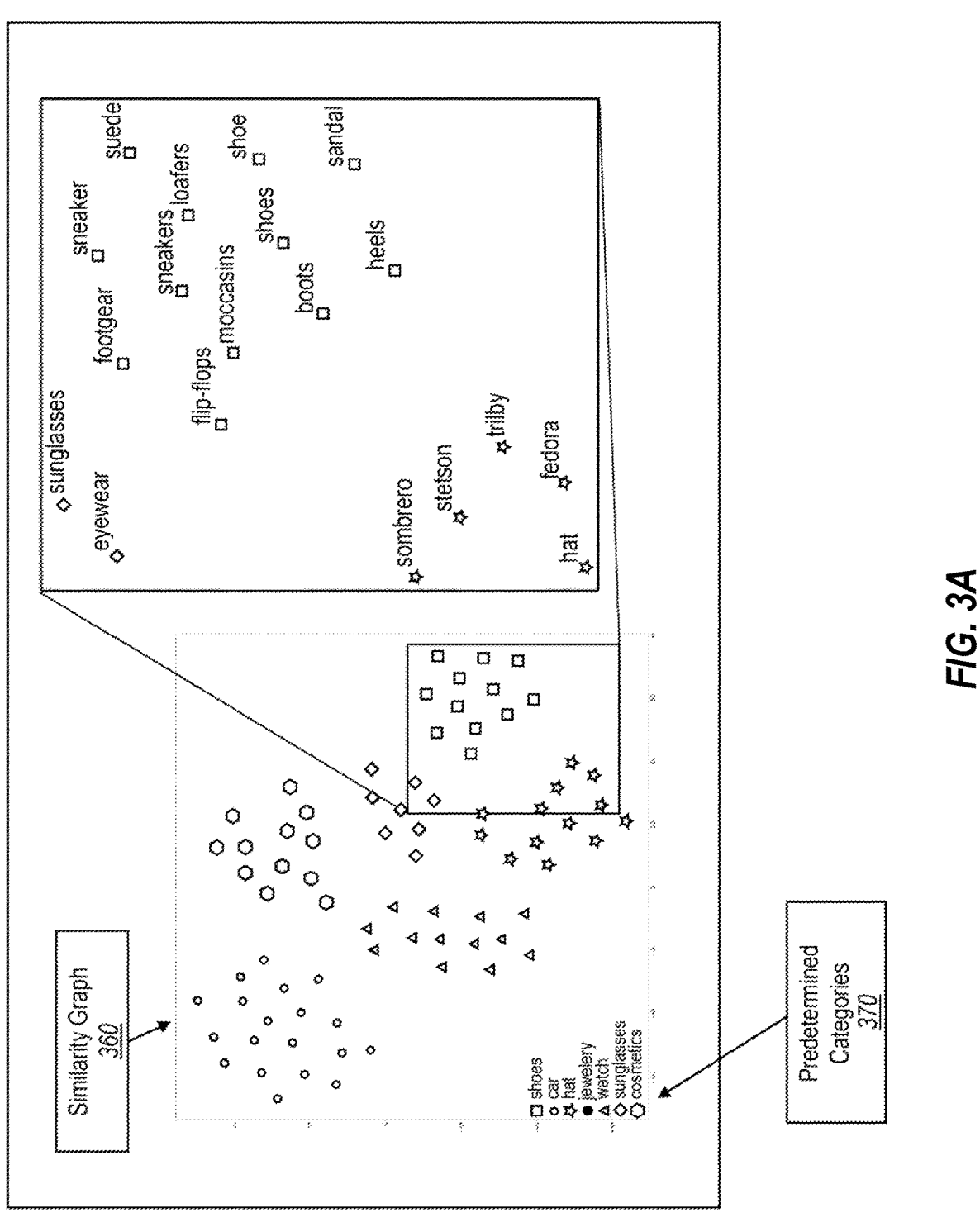
FIG. 3A illustrates an example showing how embeddings associated with different terms referenced in the multimedia content can be used to identify categories or to associate those terms with categories that can be ranked based on dominance within the multimedia content.

FIG. 3A illustrates a similarity graph 360 of terms that have been extracted and processed for similarity. The similarity processing can be based on relative similarity to predetermined categories (e.g., categories or keywords provided by a third party, such as predetermined categories 370).

The similarity processing can alternatively be based on absolute similarity scores derived from the categorization module using the base embeddings of the extracted terms and processed by an algorithm that quantifies each term relative to a base value, and/or that determines the relative similarity between the different terms extracted from the multimedia content.

Figure 3B:
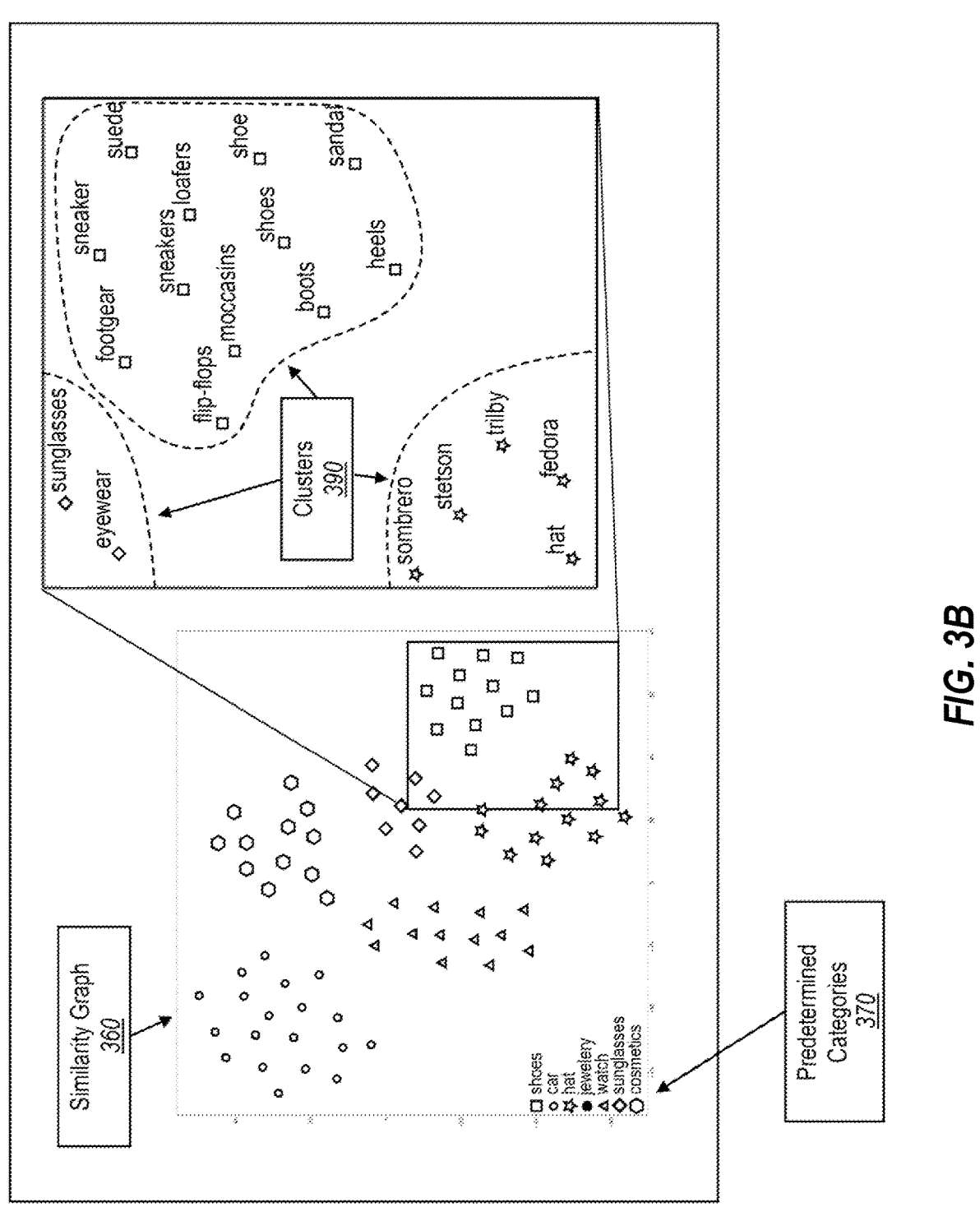
FIG. 3B illustrates an example of clustered terms or other items identified within multimedia content in which the clustering corresponds to different categories associated with the identified terms.

FIG. 3B is similar to FIG. 3A. However, in this illustration, clusters 390 are formed for the different predetermined categories 370. These predetermined categories 370 may be key terms provided by a third party (e.g., eyewear, car, hat, jewelry, watch, sunglasses, cosmetics). Then, during the processing of the multimedia content, the systems can determine which terms referenced in the multimedia content are relevant to the predetermined categories 370, based on their embeddings and cosine similarities to corresponding embeddings for the predetermined categories 370. In particular, the aforementioned categorization of the extracted terms can take place by determining the relative similarity distance of the extracted terms to the predefined categories based on the cosine similarities of their embeddings and a comparison to the relative similarities of the other terms. A threshold of similarity or maximum distance in calculated scores or embedding values can be established to place different terms in the different categorization clusters 390, where each cluster may correspond to a different category.

If a predetermined category is not already known for a cluster, a new category label can be generated based on natural language processing of the corresponding terms in that cluster. This may be performed, for example, by selecting a central most positioned term within the cluster and/or by identifying a term that is generic to all of the terms in that particular cluster. For example, if the category was not already provided by a third-party entity, the system may generate the category label (e.g., Hat) that is generic to the extracted terms in that cluster (e.g., sombrero, Stetson, trilby, fedora, hat).

As previously noted, this process can be performed for the multimedia content as a whole (e.g., an entire video file) and/or for any particular segments identified within the multimedia content (e.g., an introduction, a particular scene, or a particular duration of a video file). Accordingly, the illustrated similarity graph 360 may correspond to any predefined temporal range of the multimedia content and/or any predetermined set of segments of the multimedia content, which may include the entirety of the multimedia content.

This process is particularly beneficial for identifying the categories that are most relevant/dominant for a particular segment of a multimedia media file. This can also be used as a reverse look-up, to find media segments that are most relevant to particular categories or keywords. This reverse look-up process is enabled by indexing the categorization data for the different segments based on timestamps or other location information (e.g., by scene or other segmentation identifiers). Such index data 200 is referenced in FIG. 2A and FIG. 4. In these figures, the flow diagrams show index data being indexed or used by the different models during the processing of the multimedia content.

Figure 2C:
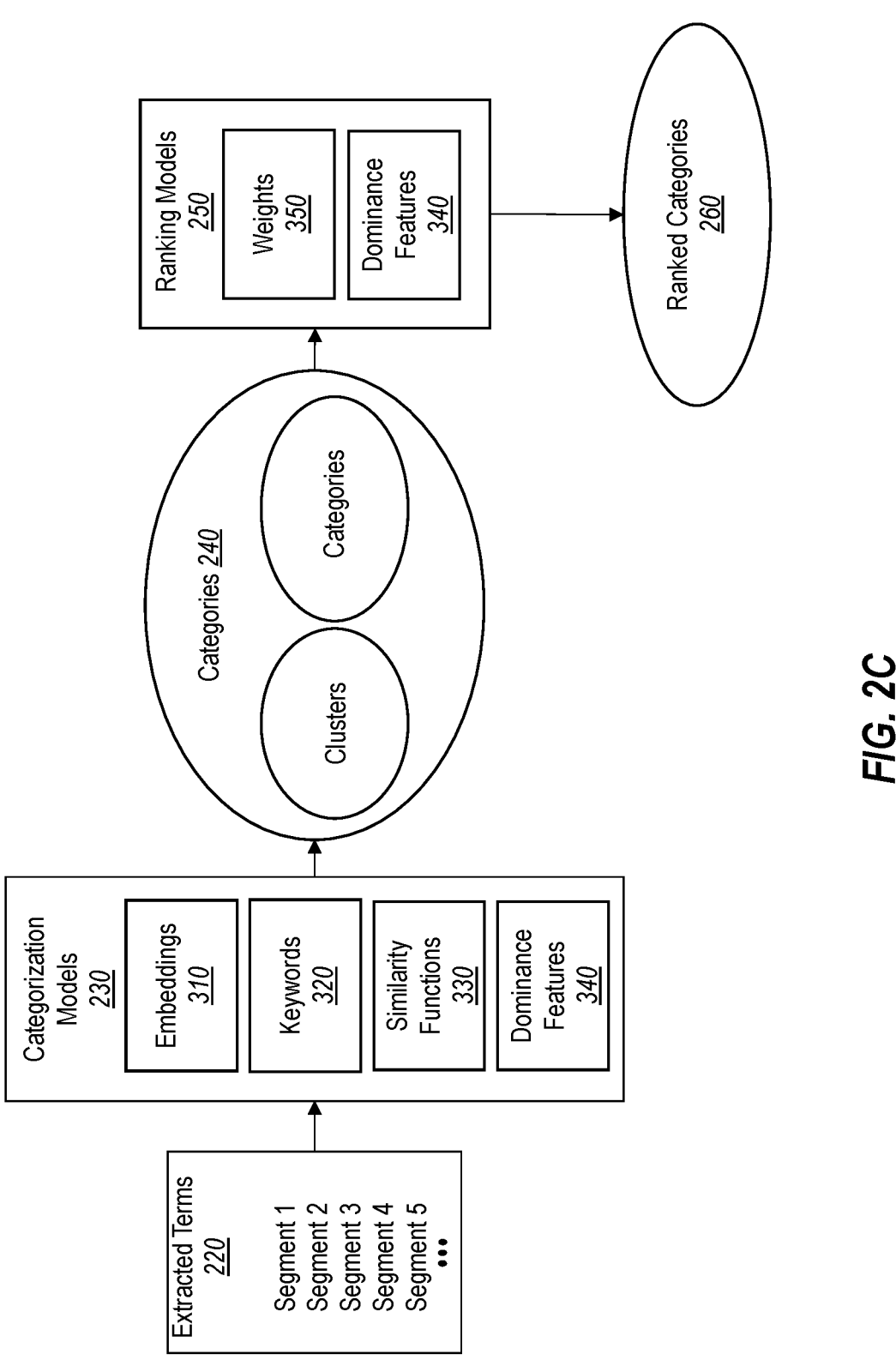
FIG. 2C illustrates another example flowchart for processing multimedia content to categorize terms identified in the multimedia content, as well as to rank those categories based on dominance within the multimedia content.

Attention is now redirected to FIG. 2C, once the set of categories 240 has been identified for the referenced terms (extracted terms 220), the ranking models 250 process the set of categories 240 to generate a set of ranked categories 260 that ranks the various categories by relative relevance to the multimedia content. This processing may include the application of a regression ranking model or any other model that is configured to analyze the various similarities of the terms (as quantified by the categorization models 230) and that can determine which categories are most dominant relative to the other identified categories for any segment(s) of the multimedia content.

This ranking process may include, for example, applying weights 350 to different dominance features associated with the identified categories 240 and/or the extracted terms 220 corresponding to the identified categories 240 and/or extracted terms 220 (e.g., the similarity of the terms to category descriptions, confidence that the term insights or category insights are relevant to a given segment, the relevance of the terms or categories to other terms referenced at a given timestamp or range of time in the analyzed segment(s)).

In some instances, the weights 350 increase the consideration of the frequency of terms presented or the duration of terms presented within a particular segment that are determined to be related to identified categories. In other instances, the weights 350 increase the consideration of terms that are determined to be more similar to the category descriptions. In other instances, the weights 350 increase the consideration or importance of terms that are visually presented relative to terms that are only spoken.

The attributes, to which the ranking models 250 apply weights 350, may also include additional considerations, such as the source of the extracted terms (e.g., transcript, audio, visual data), any processing undergone by the extracted terms (e.g., translation, modification and/or replacement), other attributes about how the terms were presented in the media (e.g., size or volume of the term, a speaker who spoke or presented the term, presence of other terms within the segment(s), repetition of the same term within the segment(s), positive or negative emotions or characterizations associated with the terms).

Figure 4:
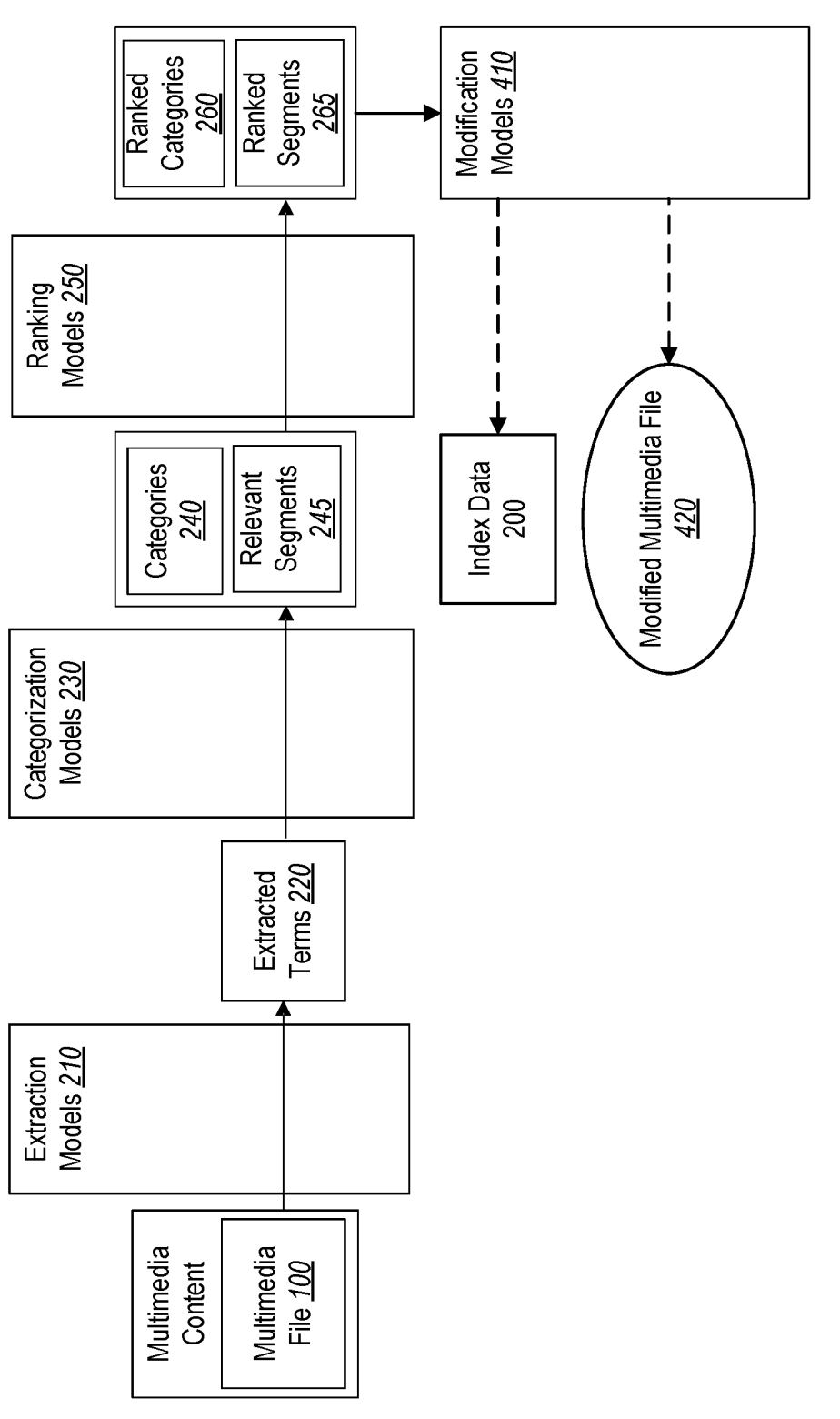
FIG. 4 illustrates an example of a multimedia processing flowchart in which terms referenced in multimedia content are identified and used to rank dominant categories associated with the terms and in which the multimedia content is modified to reflect the ranking of the dominant categories for the multimedia content.

FIG. 4 also illustrates how the system can modify the media files (e.g., by generating modified media file(s) 420) after the different categories have been ranked.

Notably, the ranking, as described above can include ranking the categories by relevance to the multimedia content from which the corresponding terms were extracted. The ranking can also include, additionally or alternatively, ranking or identifying the different segments or other designated portions of the multimedia content (e.g., timestamp ranges of the content) that are determined to be most relevant to specified keywords or other predetermined categories provided to the system. This may include, for example, identifying locations in a media file where terms related to the corresponding category terms or keywords were extracted by timestamp or scene.

The modification of the files can include embedding tags or other metadata in a multimedia file that identifies the index data referenced above for correlating the temporal locations of the multimedia content with labels associated with the extracted terms and/or categories associated with the referenced terms. This may also include generating or modifying index data that references and cross-links the identified categories and relevant locations of the multimedia content in an index. This index generation and/or modification process may be performed for all categories that are identified or, alternatively, only a selected set of one or more of the categories that are determined to satisfy a threshold of relevance. This threshold of relevance can be defined as a percentage, an absolute magnitude, and/or a set of a predetermined quantity of the most relevant categories (e.g., top one, two, three, or more categories).

In some instances, modification models 410 are trained on similar training data to add or modify the referenced index data 200. The modification models 410 may also be trained to generate modified multimedia files (e.g., modified multimedia file 420) by adding or linking additional content (e.g., an advertisement, a related video) to the multimedia file 100 being processed and such that the modified multimedia file 420 will render the additional content during the rendering of the modified multimedia file 420. In such instances, the additional content may be selected based on the relevance of the additional content to the categories that were previously determined to be relevant to particular portions of the multimedia file 100 that are now linked to the additional content.

In this manner, a third-party (e.g., an advertiser) can provide key terms that they want to provide additional content (e.g., an advertisement) for (along with the additional content to be used) and request or specify that the additional content be rendered with media content and at the temporal location(s) of the media that is determined to be relevant to the specified key terms according to a predetermined relevance threshold (e.g., a most relevant portion of the media or only media that is determined to be at least n % relevant).

The system can then match the additional content (e.g., advertisements) to content that has been identified from the media files as corresponding to categories that match the specified key terms and provide links in the media file for rendering the additional content at the relevant temporal locations (e.g., pausing the media file and accessing the advertisement with the specified links). Alternatively, the system can splice the multimedia content and add the additional content directly into the relevant temporal locations of the multimedia content. In other alternative configurations, the system can reference the index to determine when to insert or play the additional content during the rendering of the multimedia content.

Figure 5:
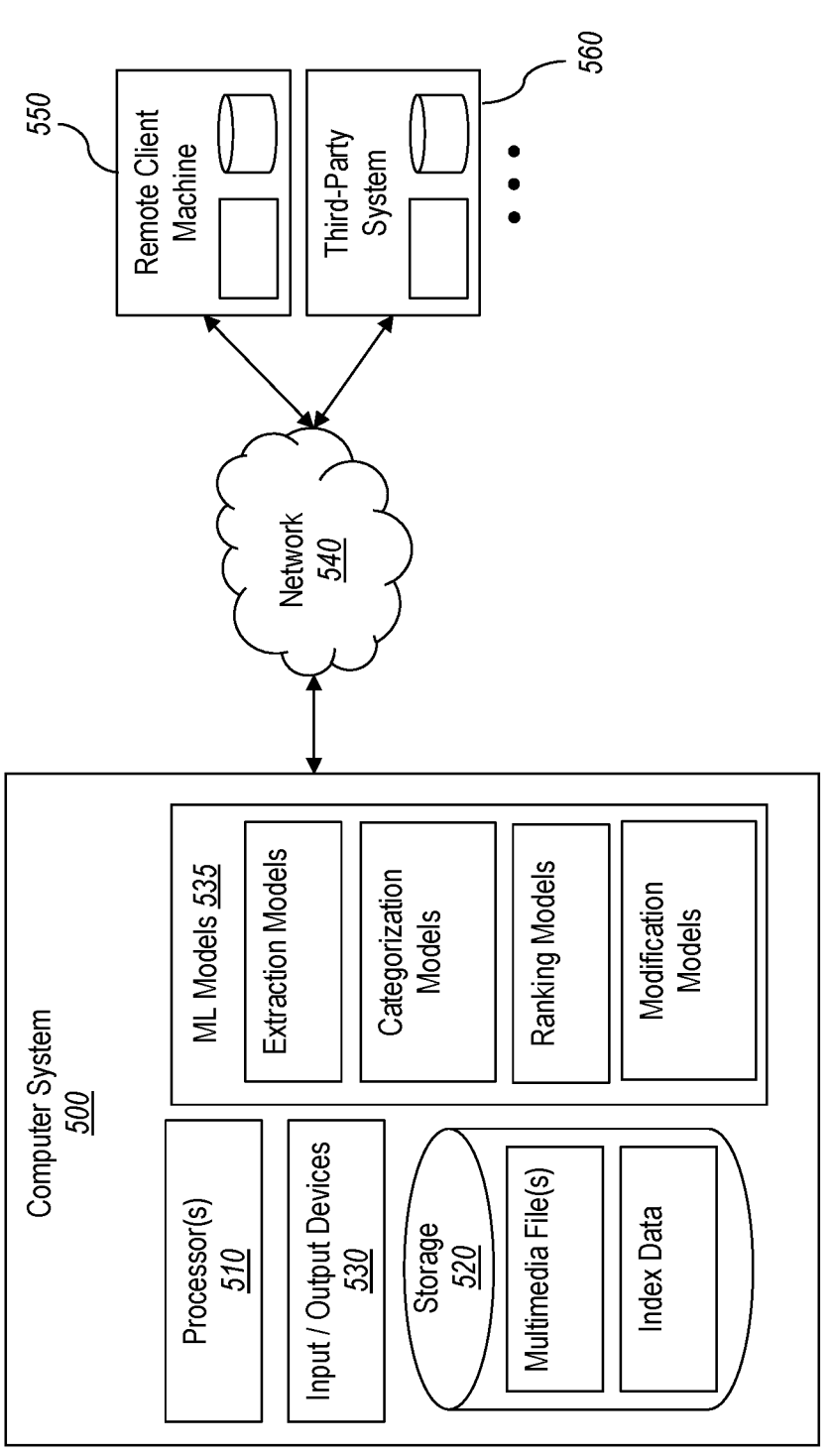
FIG. 5 illustrates an example computing environment in which a computing system incorporates and/or is utilized to perform disclosed aspects of the disclosed embodiments.

Attention is now directed to FIG. 5. This illustration shows a computer system 500 that incorporates and/or can be used to implement features of the disclosed invention. This computer system 500 includes a processing system comprising hardware processor(s) 510 and storage 520 that store computer-executable instructions (not shown) that are executable by the processor(s) 510 to implement the disclosed functionality described herein.

The storage can also store the referenced media files and index data, as well as one or more of the machine learning models described herein.

The system also includes input and output devices 530 that enable the different models to interface with each other and to receive user input (e.g., keyboards or microphones for receiving user input specifying categories to find relevant multimedia content for and/or for specifying multimedia content to be processed by machine learning models 535 to identify relevant categories for terms referenced by the multimedia content). The input and output devices may also include displays, speakers, and other output devices for rendering outputs generated by the machine learning models 535 (e.g., similarity graphs) and other outputs (e.g., specified segments, timestamps, and multimedia content or categories identified by the machine learning models 535).

As shown, the computer system 500 is connected through a network 540 comprising one or more wired and/or wireless connections to remote client machines that may remotely store and/or process components and functionality associated with the computer system 500. The computer system 500 is also connected through the network 540 to third-party systems that may provide media content, advertisements, category schemas, keywords, or other data to the computer system. The user input and output may be received by and provided to the third-party system and the remote client machines, each of which contains processors and corresponding storage devices having stored instructions that are executable by the processors to implement the functionality described herein.

Attention will now be directed to FIGS. 6-9, which illustrate different flowcharts (600, 700, 800, and 900) of acts associated with performing the methods described herein and which are implemented by the computer system 500 and/or the related systems (550, 560) described above.

In FIG. 6, for example, a flowchart 600 is illustrated that includes acts performed by a system for accessing multimedia content (act 610) and for identifying different segments of the multimedia content (act 620). As previously noted, the multimedia content can be any type of multimedia content, including stored multimedia files (e.g., videos) and streaming multimedia content.

The illustrated acts also include the system identifying different natural language terms represented or referenced from the different segments of the media (act 630). This may be performed, for example, by applying different term extraction models to each specified segment. In some instances, this includes applying different term extraction models that are trained on processing different domains or types of media content (e.g., a first model trained to extract terms from transcripts, a second model trained to extract terms from image data, a third model trained to extract terms from audio data, another model trained to summarize and/or filter identified terms and to extract related terms, and/or any combination of different models configured and trained to identify and perform different types of natural language processing on terms presented in or related to the multimedia content in the specified segment(s) of the media file).

Next, the system applies embeddings to the identified terms (act 640) and categorizes the different terms to generate a set of relevant categories (act 650) based on the embeddings and other relevant attributes associated with terms and corresponding multimedia content.

Finally, the system ranks the different categories of terms and/or terms themselves based on a calculated dominance feature value associated with each of the different category terms (act 660), such as by using the ranking models described earlier. This way, it is possible to identify the most dominant or relevant category or topic for each segment(s) and/or the entirety of the multimedia content.

The flowchart 700 of FIG. 7 is similar to that of FIG. 6, with acts 710, 720, 73, 740, 750, and 760 corresponding to acts 610, 620, 630, 640, 650, and 660. However, in FIG. 7, the system further indexes data that references or links categorization data identified by the system with the different multimedia content (e.g., segments) determined to be most relevant to the correspondingly most relevant category or terms (act 770).

Act 770 may also include, in some instances, modifying a multimedia file, by modifying the index data associated with the multimedia file, as previously discussed. The generating and processing of the index data may occur during a single process after the ranking processes (act 760) and/or incrementally by indexing different corresponding portions of index data that is generated/processed during each of the aforementioned processes (e.g., after identifying segments (act 720), after identifying terms (act 730), after embedding the terms (act 740), after categorizing the terms (act 750) and/or after ranking the categories (act 760).

Attention is now directed to FIG. 8. This flowchart 800 corresponds to embodiments in which a system identifies portions of multimedia content that are most relevant to predetermined classifications or categories and terms, such as may be provided by a third-party entity and/or that correspond to a predetermined categorization schema.

As shown, the method includes a system accessing multimedia content (act 810) and identifying a particular categorization to be processed against the multimedia content (act 820). This may include receiving a set of terms from a third-party entity, for example. These terms may be received from the third-party in the form of a keyword or category.

Next, the system identifies the different segments (or entirety) of the multimedia content to be processed for relevance to the predetermined categories (act 830). In this manner, it is possible to establish the granularity in which the multimedia content will be processed for relevance to the different categories.

Next, the system applies embeddings to the terms that are extracted from the different segments of the media file (act 850). The embeddings can be based on a combination of the terms and the relevant attributes associated with the terms, as previously described.

Next, the system determines the relative relevance of the different terms in the specified segment(s), relative to the predetermined categories (e.g., keywords) specified by the particular classification scheme that was identified (act 860).

Finally, the system identifies the relevant segment(s) of the media file for each of the specified categories, based on a calculation of the dominance features associated with each of the different extracted terms identified for the different segments (act 870). This may include ranking the segment(s) that are most relevant to any particular category and/or identifying only the segment(s) that meet or exceed a particular relevance threshold to the particular categories. These processes can be performed by the extraction, categorization, and ranking models described above.

Flowchart 900 of FIG. 9 shows a similar embodiment to that described in flowchart 800. However, in this flowchart 900, the system is further configured to modify the multimedia file to include or link to additional content (e.g., advertisements or index data) when the relevance of multimedia content is determined to meet or exceed predetermined relevance thresholds (act 980).

As suggested above about act 770, the system may modify a file with additional content by updating (e.g., adding to or modifying) the metadata of the multimedia content and/or by embedding additional content directly into the multimedia content. This process may include adding links and other index data to separate indexes that are used when playing or otherwise rending the multimedia content.

As also suggested above, the generating and processing of the index data and/or modification of the multimedia content may occur during a single operation, e.g., after the identification of and ranking of relevant media segments (act 970) and/or incrementally by indexing different corresponding portions of index data that is generated and/or otherwise processed during each of the aforementioned processes (e.g., after identifying the particular content and classifications and/or media segments (acts 910, 920, 930), after identifying terms extracted from those segments (act 940), after embedding the terms (act 950), after determining relative relevance of the categories (act 960), and/or after determining the relevance of the multimedia segment(s) to the identified categories (act 970).

In this embodiment, the act of identifying the categories for a particular classification (act 920) can comprise receiving a query for a particular segment of the media content that is most relevant to a particular category. Then, the relevant segment can be provided as a reply to the query, that was received prior, when the system identifies the segment that is most relevant to that particular category (act 970).

With regard to all of the foregoing, it will be appreciated that the disclosed embodiments may include or be practiced by or implemented by a computer system, such as computer system 500 of FIG. 5, which is configured with one or more hardware processors and computer storage that stores computer-executable instructions that, when executed by one or more processors, cause various functions to be performed, such as the acts recited above.

Embodiments within the scope of the present disclosure also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, embodiments of the disclosure can comprise at least two distinctly different kinds of computer-readable media: physical computer-readable storage media and transmission computer-readable media.

Physical computer-readable storage media includes random access memory (RAM), read-only memory (ROM), electrically erasable programmable read-only (EEPROM), compact disk read-only memory (CD-ROM), or other optical disk storage (such as DVDs, etc.), magnetic disk storage or other magnetic storage devices, or any other hardware storage devices which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links that can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a network interface controller (NIC)), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The disclosed systems and methods may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by a computer system for processing multimedia content comprising a plurality of temporally sequential segments, the method comprising:
   accessing the multimedia content;
   identifying the plurality of temporally sequential segments of the multimedia content;
   identifying terms that are represented within each segment of the plurality of temporally sequential segments based on applying a set of term extraction models to each segment;
   applying embeddings to the terms that are identified;
   categorizing each term, respectively, to a relevant category from a plurality of categories based on the embeddings applied; and
   identifying a most dominant category of the plurality of categories for the multimedia content based on ranking the plurality of categories for the multimedia content and by at least calculating a dominance feature relevance of terms that were identified within each segment of the plurality of temporally sequential segments of the multimedia content and that were categorized within each category of the plurality of categories.

2. The method of claim 1, wherein the categorizing of each term is further based on and a comparison of relative similarity for each term with each category of the plurality of categories.

3. The method of claim 1, wherein the terms represented within each segment of the plurality of temporally sequential segments of the multimedia content are identified by performing speech-to-text on audio data contained in the multimedia content.

4. The method of claim 1, wherein the terms represented within each segment of the plurality of temporally sequential segments of the multimedia content are identified by extracting text from a transcript of the multimedia content.

5. The method of claim 1, wherein the terms represented within each segment of the plurality of temporally sequential segments of the multimedia content are identified by performing character recognition on text identified in visual data of the multimedia content.

6. The method of claim 1, wherein the terms represented within each segment of the plurality of temporally sequential segments of the multimedia content are identified by a term extraction model identifying the terms from unspoken sounds identified in audio data of the multimedia content.

7. The method of claim 1, further comprising:
   identifying the dominant category of the plurality of categories for a particular segment of a plurality of temporally sequential segments of the multimedia content.

8. The method of claim 1, further comprising:
   generating or modifying an index that identifies the most dominant category for the multimedia content.

9. The method of claim 1, further comprising:
   ranking a relevance of the plurality of different segments of the multimedia content to a particular category.

10. The method of claim 9, further comprising:
   receiving a query for a particular segment of the multimedia content that is most relevant to the particular category; and
   identifying the particular segment.

11. The method of claim 1, further comprising:
   receiving a user query for the dominant category for a particular segment of the plurality of temporally sequential segments of the multimedia content prior to identifying the most dominant category.

12. The method of claim 1, further comprising:
   identifying additional content related to the relevant category of the plurality of categories.

13. The method of claim 12, further comprising:
   embedding a link to the additional content within a relevant segment of the multimedia content that is determined to meet or exceed a threshold of relevance to the additional content.

14. A method implemented by a computer system for processing multimedia content, comprising:
   accessing the multimedia content;
   identifying a plurality of segments of the multimedia content;
   identifying terms that are represented within a first segment of the plurality of segments based on applying a set of term extraction models to the first segment;
   identifying terms that are represented within a second segment of the plurality of segments based on applying the set of term extraction models to the second segment;
   applying embeddings to the terms that are identified;
   determining a relative relevance of a plurality of different categories to the first segment of the plurality of segments based on the terms that are represented within the first segment;
   determining a relative relevance of a plurality of different categories to the second segment of the plurality of segments based on the terms that are represented within the second segment;
   identifying a most dominant category of the plurality of different categories for the first segment of the plurality of segments of the multimedia content based on the relative relevance of the terms in the first segment; and identifying a most dominant category of the plurality of different categories for the second segment of the plurality of segments of the multimedia content based on the relative relevance of the terms in the second segment, wherein the most dominant category of the plurality of different categories for the second segment is a different dominant category than the most dominant category of the plurality of different categories for the first segment.

15. The method of claim 14, wherein the computer system uses models that are trained to identify and classify objects represented in images of the multimedia content to identify the terms represented in the first segment of the plurality of segments that correspond to identified and classified objects represented in the images of the multimedia content.

16. The method of claim 14, wherein the computer system identifies a different category of the plurality of categories for each segment of a plurality of different segments of the multimedia content.

17. The method of claim 14, further comprising:
modifying the multimedia content with a tag that (i) identifies the terms or the most dominant category for the first segment or that (ii) identifies additional content related to the most dominant category.

18. The method of claim 14, wherein the multimedia content comprises streaming multimedia content.

19. A method implemented by a computer system for processing multimedia content comprising a plurality of temporally sequential segments, the method comprising:
accessing the multimedia content;
identifying the plurality of temporally sequential segments of the multimedia content;
identifying terms that are represented within each segment of the plurality of temporally sequential segments based on applying a set of term extraction models to each segment;
applying embeddings to the terms that are identified;
for each segment of the plurality of temporally sequential segments, determine a relative relevance of the terms to a plurality of categories; and
modifying the multimedia content to include supplemental content corresponding to a particular category of the plurality of categories for a segment of the plurality of temporally sequential segments in which the relative relevance for a category included in the plurality of categories meets a particular relevance threshold.

20. The method of claim 19, further comprising:
generating or modifying index data that identifies the segment with a link to the supplemental content.

* * * * *